(12) United States Patent
Richard Z.

(10) Patent No.: US 7,331,336 B2
(45) Date of Patent: Feb. 19, 2008

(54) POWER AIR-FUEL LEVITATION COMPRESSION

(75) Inventor: Hricak Richard Z., Potomac, MD (US)

(73) Assignee: Econet International Corporation, Rockville, MD (US)

( * ) Notice: Subject to any disclaimer, the term of this patent is extended or adjusted under 35 U.S.C. 154(b) by 0 days.

(21) Appl. No.: 10/213,277

(22) Filed: Aug. 6, 2002

(65) Prior Publication Data

US 2003/0101973 A1  Jun. 5, 2003

Related U.S. Application Data

(60) Provisional application No. 60/370,798, filed on Apr. 8, 2002, provisional application No. 60/310,318, filed on Aug. 6, 2001.

(51) Int. Cl.
  *F02B 75/10* (2006.01)
(52) U.S. Cl. .................. 123/536; 123/538; 123/539
(58) Field of Classification Search ........ 123/536–539; 60/275; 422/171, 177, 179, 211, 186.01; 210/222, 695
  See application file for complete search history.

(56) References Cited

U.S. PATENT DOCUMENTS

| | | | | |
|---|---|---|---|---|
| 4,461,262 A | * | 7/1984 | Chow | ............................ 123/536 |
| 4,568,901 A | * | 2/1986 | Adam | ............................ 335/305 |
| 4,572,145 A | * | 2/1986 | Mitchell et al. | ............. 123/538 |
| 5,048,498 A | * | 9/1991 | Cardan | ........................ 123/538 |
| 5,063,368 A | * | 11/1991 | Ettehadieh | ................... 335/301 |
| 5,070,852 A | * | 12/1991 | Po et al. | ...................... 123/538 |
| 5,129,382 A | * | 7/1992 | Stamp, Sr. et al. | .......... 123/536 |
| 5,331,807 A | * | 7/1994 | Hricak | ......................... 123/539 |
| 6,050,872 A | * | 4/2000 | Cahill et al. | ................... 446/89 |
| 6,456,178 B1 | * | 9/2002 | Chiu | ........................... 123/538 |
| 6,596,163 B1 | * | 7/2003 | Parker | ......................... 210/222 |

* cited by examiner

*Primary Examiner*—Marguerite McMahon
(74) *Attorney, Agent, or Firm*—Young & Thompson (57) ABSTRACT

Apparatus for magnetically conditioning incoming air and fuel to an internal combustion engine to improve engine operation. Magnets are applied in a bipolar arrangement to the fuel system and air intake apparatus of an internal combustion engine system for reducing emissions and improving fuel efficiency. Magnets may also be applied in a bipolar arrangement to the exhaust system and catalytic converter of an internal combustion system of automotive type for reducing exhaust emissions and improving the performance of a catalytic converter. Furthermore, a combination of magnetizing apparatus that, in conjunction with air and fuel magnetizing apparatus, will improve engine efficiency by introducing a magnetic charge to engine exhaust, coolant water, engine oil, transmission fluid, and gear box fluid, in combination with the above embodiment.

7 Claims, 5 Drawing Sheets

POWER AIR-FUEL LEVITATION COMPRESSION

CROSS REFERENCE TO RELATED APPLICATIONS

This application is from provisional application Ser. No. 60/310,318 filed on Aug. 6, 2001, and provisional application Ser. No. 60/370,798 filed on Apr. 8, 2002, incorporated herein by reference.

BACKGROUND OF THE INVENTION

1. Field of the Invention

The present invention relates to magnetic engine fluid conditioning systems, and in particular, to the incorporation of magnetic apparatus of a specific polarity to a combination of the fuel intake apparatus and air intake apparatus, the radiator inlet, the transmission housing, the gearbox housing, and the oil filter of an internal combustion engine system for the purpose of reducing emissions and improving fuel efficiency.

2. Description of the Background

There is a great scientific and regulatory interest in emissions from motor vehicles such as: (1) unburned hydrocarbons that are almost entirely intact or broken down components of the fuel, (2) carbon monoxide (CO) which is a common byproduct of the combustion of complex hydrocarbons, and (3) oxides of nitrogen ($NO_x$) which are typically the result of the combustion of impurities or additives in petroleum distillates. Unburned HC and $NO_x$ react in the atmosphere to form photochemical smog. Smog is highly oxidizing in the environment and is the prime cause of eye and throat irritation, bad odor, plant damage, and decreased visibility. Oxides of nitrogen are also toxic. CO impairs blood capability to carry oxygen to the brain, resulting in slower reaction times and impaired judgment.

There is great environmental concern with the production of these pollutants by motor vehicles, and regulatory standards for these pollutants have steadily become more stringent. Motor vehicle manufacturers are constantly refining car designs to reduce their emissions of these pollutants, with many of these refinements increasing the cost of the vehicle and compromising the weight and structural strength of the vehicle. Furthermore, no measure currently taken by motor vehicles manufacturers has any effect on the over 100 million registered vehicles already on the road in the United States, and uncounted tens of millions more elsewhere in the world.

This attention to the pollution of motor vehicles should in no way lessen concern about other internal combustion engines, such as farm equipment, electric generators, or lawn and gardening equipment. It is apparent to one of ordinary skill in the relevant art that a system that improves fuel efficiency and reduces emissions of motor vehicle engines is likely to be amenable to incorporation in any internal combustion engine having similar fuel intake, air intake, and exhaust systems. This class of engines includes, but is by no means limited to, engines of the Otto cycle, the Diesel cycle, and the Wankel cycle. It is further desirable that such a system be amenable to incorporation in internal combustion engines burning any variety of organic fuels, including but not limited to gasoline, diesel oil, and alcohol, as well as mixtures of the above.

An examination of the art reveals a number of magnetic devices which have been produced to enhance the operation of internal combustion engines by application of static magnets and electromagnetic principles. It is known that the use of permanent magnets on the fuel line of an automotive internal combustion engine for subjecting the fuel to a magnetic field will improve the performance of the engine. It also has been shown that subjecting incoming oxygen containing gas to a magnetic field will also increase combustion efficiency.

A review of the relevant prior art shows the use of magnets for improving the combustion of hydrocarbon fuels in engines, thus demonstrating that the general principle is well known. By way of example:

U.S. Pat. No. 3,349,354 discloses the use of magnets to impose an electromagnetic field on flowing fuel.

U.S. Pat. No. 3,830,621 teaches the use of magnets to impose a north magnetic field on the flowing oxygen containing gas to reduce unwanted emissions.

U.S. Pat. No. 4,414,951 describes a system in which the fuel line is subject to a magnetic field with alternating poles.

U.S. Pat. No. 4,461,262 discloses a fuel treating device in which both the incoming air and fuel are subject to longitudinal magnetic fields with alternating poles.

U.S. Pat. No. 4,568,901 shows the use of magnets on a hydrocarbon fuel carrying duct for ionizing particles of the fuel, applying the south poles of the magnets.

U.S. Pat. No. 4,711,271 describes the use of magnets to subject oil to a magnetic field to reduce the buildup of undesirable materials along the inside wall of the pipe.

U.S. Pat. No. 4,755,288 discloses the use of magnets to subject fuel to a magnetic force field with alternating poles.

U.S. Pat. No. 5,129,382 describes the use of magnets to impose a magnetic field on the fuel to an engine with both poles of the magnetic adjacent the fuel conduit.

U.S. Pat. No. 5,161,512 has a helical array of magnets surrounding a fuel carrying conduit to concentrate the magnetic field on the flowing fluid.

None of the preceding patents teaches the present invention. In particular, the application of a magnet of known polarity to the fuel tank in the vicinity of the interface of the fuel tank and the fuel line is not disclosed. Furthermore, the use of flexible magnets such as ferromagnetic ceramic magnets is not disclosed. Also, a magnet applied to the air filter casing as opposed to the air inlet duct is not disclosed.

U.S. Pat. No. 5,331,807 to the inventor of the present invention discloses an effective but less optimal version of the present invention. In particular, the application of a magnet of known polarity to the fuel tank in the vicinity of the interface of the fuel tank and the fuel line is not disclosed. Furthermore, the combination of flexible magnets such as ferromagnetic ceramic magnets of cross section narrower than the diameter of the fuel line with a flexible attaching member are not disclosed. Also, a magnet applied to the air filter casing as opposed to the air inlet is not disclosed.

In light of the foregoing, it is therefore highly desirable to achieve further improvements in fuel efficiency and lower emissions by the application of magnetic fields to internal combustion engine systems to both the fuel and the air being delivered to the engine. There is a further need to reduce emissions of an internal combustion engine of automotive type by subjecting the exhaust gas from the exhaust manifold entering the catalytic converter and the exhaust gas in the catalytic converter to magnetic fields adjacent opposite poles of one or more magnets. There is a further need to make such a system amenable to installation and maintenance in both newly manufactured vehicles as well as existing vehicles. There is a further need to make such a system amenable to installation and use in a variety of internal combustion cycles burning a variety of different fuels.

Furthermore, it is likewise desirable to provide a combination of magnetizing apparatus that, in conjunction with air and fuel magnetizing apparatus, will improve engine efficiency by introducing a magnetic charge to engine exhaust, coolant water, engine oil, transmission fluid, and gear box fluid, in combination with the above embodiment.

SUMMARY OF THE INVENTION

In light of the foregoing, it is therefore a primary object of the present invention to provide a system of magnetic apparatus of a specific polarity to the fuel intake apparatus and air intake apparatus of an internal combustion engine system for the purpose of reducing emissions and improving fuel efficiency.

It is a further object of the present invention to provide a system of magnetic apparatus that is amenable to installation in both internal combustion engine systems of new manufacture as well as existing internal combustion engines.

It is a further object of the present invention to provide a system of magnetic apparatus that is amenable to installation in internal combustion engines of the Otto cycle, the Diesel cycle, and the Wankel cycle.

It is a further object of the present invention to provide a system of magnetic apparatus that is effective and amenable to use in internal combustion engines that burn gasoline, diesel oil, other petroleum distillates, organic distillates such as alcohol, or any combination of these fuels.

It is a further object of the present invention to provide improved polarizing magnets to the air intake apparatus of an internal combustion engine to increase their effectiveness.

It is a further object of the present invention to provide improved polarizing magnets to the fuel intake apparatus of an internal combustion engine to increase their effectiveness.

It is a further object of the present invention to reduce emissions of an internal combustion engine of automotive type by subjecting the exhaust gas from the exhaust manifold entering the catalytic converter and the exhaust gas in the catalytic converter to magnetic fields adjacent opposite poles of one or more magnets.

It is a further object of the present invention provide a combination of magnetizing apparatus that, in conjunction with air and fuel magnetizing apparatus, will improve engine efficiency by introducing a magnetic charge to engine exhaust, coolant water, engine oil, transmission fluid, and gear box fluid, in combination with the above embodiment.

In accordance with the objects of this invention, magnets of a specific design are arranged so that the flowing fuel is subject to the magnetic field adjacent one pole of a magnet while the incoming air is exposed to the magnetic field adjacent the opposite pole of a magnet.

In a preferred embodiment, one or more magnets are applied to one or more of the fuel tank and fuel line of an internal combustion engine as close as possible to the carburetor or fuel injectors with only one pole of the magnet or magnets exposed to the fuel system. One or more magnets are applied to one or more of the air intake and air filter casing in such a way as to magnetically expose the intake air to the magnetic field emanating from the pole opposite that of the pole used to expose the fuel system. The fuel and air are thereby oppositely polarized or ionized, with the result that the fuel and combustion air exhibit a stronger attraction to each other with the consequence that there is more efficient and complete bonding to each other during the combustion process.

In a further embodiment, a combination of magnetizing apparatus that, in conjunction with air and fuel magnetizing apparatus, will improve engine efficiency by introducing a magnetic charge to engine exhaust, coolant water, engine oil, transmission fluid, and gear box fluid, in combination with the above embodiment, is disclosed.

In a further preferred embodiment of this invention, the emissions of an internal combustion engine of automotive type are reduced by subjecting the exhaust gas from the exhaust manifold entering the catalytic converter and the exhaust gas in the catalytic converter to magnetic fields adjacent opposite poles of one or more magnets.

BRIEF DESCRIPTION OF THE DRAWINGS

These and other objects and advantages of the present invention will hereinafter become obvious from the following detailed description of preferred embodiments and certain modifications thereof when taken together with the accompanying drawings in which.

DESCRIPTION OF THE PREFERRED EMBODIMENTS

Figure 1A:
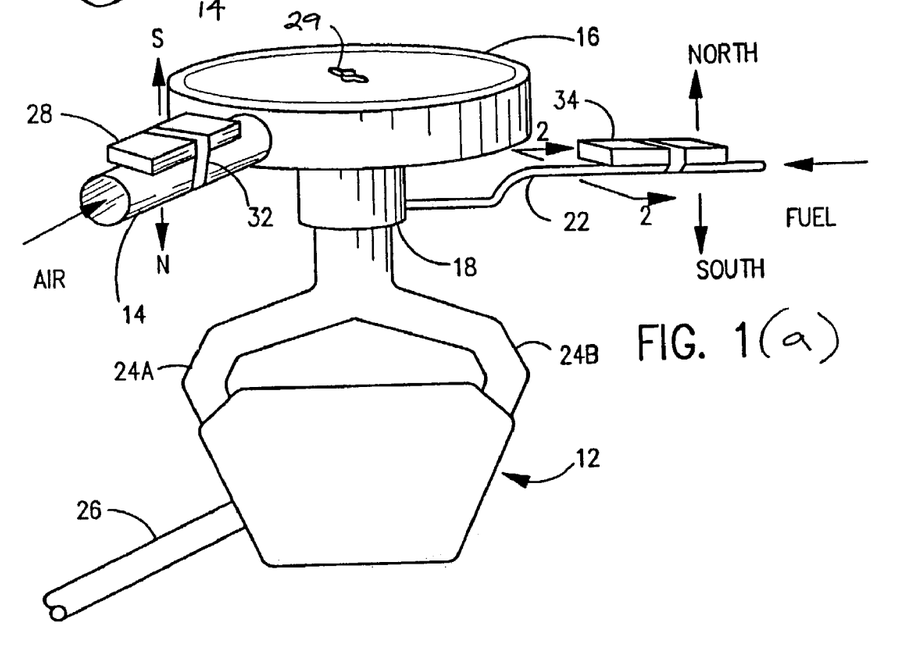
FIG. 1(a) is a schematic illustration of a preferred embodiment of the present invention incorporated into an exemplary automotive internal combustion engine.

Referring now to FIG. 1(a), and in a preferred embodiment of the present invention, there is illustrated an internal combustion engine 12 provided with an air inlet manifold 14, an air filter 16, a carburetion or fuel injection device 18 hereinafter referred to as a carburetor, a fuel line 22 carrying a hydrocarbon liquid fuel to carburetor 18, and engine fuel-air mixture intake manifolds 24a and 24b. The products of combustion are discharged from engine 12 through an exhaust pipe 26. It will be apparent to one of ordinary skill in the relevant art of the invention that the present invention is amenable to incorporation in either a carburetor, where fuel is mixed with air prior to admission to the combustion chamber, as well as an injection system, where fuel is injected directly into the combustion air in the combustion chamber.

Magnetic fields are applied to the incoming air and the incoming fuel in the following manner. In one embodiment of the present invention, mounted on air manifold 14 is a permanent bar magnet 28 attached on one side of manifold 14 with a strap 32 of suitable material such as a fabric, aluminum, or plastic. Bar magnet 28 has the shape of a right angle parallelepiped with the opposite flat sides or faces containing the poles of the magnet. The face with the north pole is adjacent manifold 14 while the face with the south pole is on the side of bar magnet 28 opposite that of manifold 14 as indicated by the arrows. Hence, the entering air within manifold 14 is exposed to the magnetic lines of force radiating from the north pole of the magnet. Bar magnet 28 provides a magnetic field of at least approximately 500 gauss, but preferably about 1500 or more gauss, to produce the effectiveness desired in this invention.

Figure 1B:
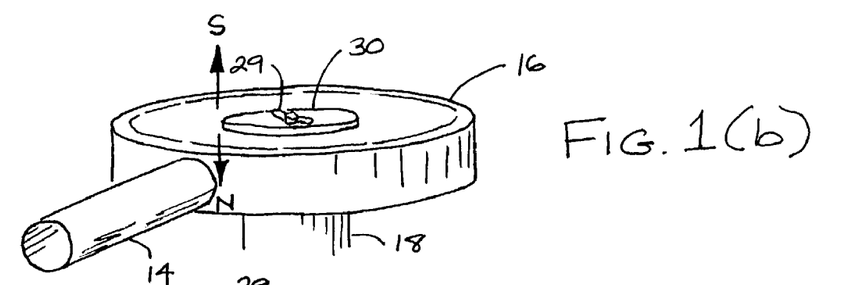
FIG. 1(b) is a partial schematic illustration an air filter system magnetic apparatus according to another preferred embodiment of the present invention incorporated into an exemplary automotive internal combustion engine.

Referring now to FIG. 1(*b*), and in a more preferred embodiment of the present invention, a shaped magnet 30 may be applied to air filter 16 by any well known and commercially available means, such as by securing it with the wing nut 29 typically securing the air filter 16 of the type shown. It will be apparent to one of ordinary skill in the art of the present invention that in modern motor vehicles air filter 16 is of various sizes, shapes, and configurations; however, so long as shaped magnet 30 is in proximity to the intake air and is of the correct polarity, it will be effective. It is further apparent that shaped magnet 30 is best applied to that portion of the intake air which is at a lower velocity, thus increasing the duration of time the intake air passes the shaped magnet 30 and thus increasing the magnetization of the intake air. It is further apparent that the application of air system magnets is not limited to one; by way of example, a bar magnet 28 may be applied to manifold 14 simultaneously with a shaped magnet 30 applied to air filter 16.

In order to protect bar magnet 28 or shaped magnet 30 from the effects of heat generated by engine 12, it may be advisable to apply coatings or apparatus of well known and commercially available type, such as aluminum vanes, for dissipating the heat.

Figure 2:
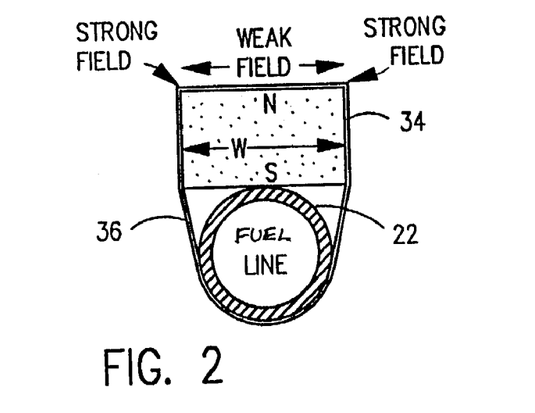
FIG. 2 is a section taken along 2-2 of FIG. 1(a).

Referring also to FIG. 2, and in a preferred embodiment of the present invention, a bar magnet 34 is mounted on fuel line 22 leading into carburetor 18. Bar magnet 34 is a permanent bar magnet held in place by a strap 36 of suitable non-magnetic material. Bar magnet 34 is similar in construction, including the insulation, to that of magnet 28 being a right angle parallepiped with the face in contact with pipe 22 being the south pole of the magnet as shown by the arrows.

The width W of bar magnet 34 is not substantially greater than the diameter or cross section of fuel line 22. It is apparent to one of ordinary skill in the art of the invention that in a magnet of this shape the magnetic fields adjacent the edges are more intense than the fields located adjacent intermediate areas of the faces. For example, in one magnet which was measured as to its magnetic field it was discovered that the maximum intensity of the fields adjacent the edges was 1100 gauss while at an intermediate location the field dropped off to 800 gauss; therefore, a substantial portion of the magnetic field produced by a wider bar magnet goes to waste.

Figure 3:
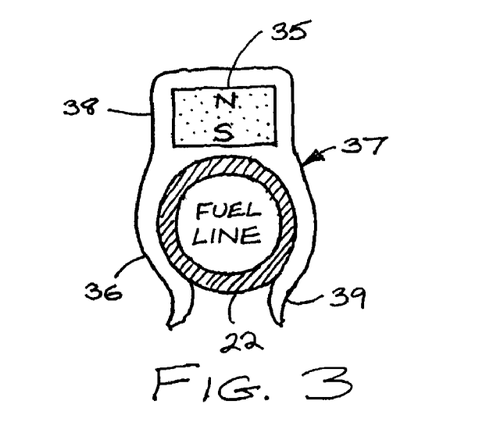
FIG. 3 is a section similar to that of FIG. 2 except that it shows a section of a magnet with a cooperating retaining clip.

Referring now to FIG. 3, and in a more preferred embodiment of the present invention, a shaped magnet 35 is mounted on fuel line 22 leading into carburetor 18. Shaped magnet 35 may be a ferrous magnet or a ferroceramic magnet that is either rigid or flexible. It is readily apparent to one of ordinary skill in the art of the invention that a flexible ferroceramic magnet is a preferred means of applying magnetic force to fuel running through a fuel line having a curved configuration, particularly when the configuration is not known beforehand. The width of shaped magnet 35 is not substantially greater than, and may be less than, the diameter or cross section of fuel line 22.

Further in reference to FIG. 3, it is a novel improvement over the prior art to provide a shaped magnet 35 in conjunction with a unitary clamp 37 configured for secure fastening about the circumference of fuel line 22. By way of example, a shaped magnet 35 may be completely surrounded by a single unitary clamp 37 made of an extruded high-strength plastic. Unitary clamp 37 has magnet engaging portion 38 for holding shaped magnet 35 in the desired position with respect to fuel line 22. Unitary clamp 37 further has fuel line engaging portion 36 for clamping to fuel line 22, and extended portion 39 for positioning said fuel line engaging portion 36 over fuel line 22 to snap into place. In this manner, the apparatus comprising shaped magnet 37 and unitary clamp 37 can be provided as a unit, which can be either flexible along its length for application to a fuel line 22 of unknown or indeterminate configuration, or of a fixed shape for application to a fuel line 22 of known configuration, or a fuel line 22 which is flexible.

It should also be noted that the exposure of the liquid hydrocarbon fuel flowing in fuel line 22 to the magnetic field is more critical to the effectiveness of this invention because there is a smaller amount of liquid in terms of volume compared to the gaseous supply of oxygen in air. Also, the cross section of fuel line 22 carrying the liquid fuel is much smaller than the cross section of manifold 14 containing the air requiring a more intense application of the magnetic field. Because of the larger cross section of the air manifold, the air manifold would be provided with at least two magnets for each one on the fuel line.

Bar magnet 34 or shaped magnet 35 should have an intensity of at least 500 gauss, but preferably at least 1100 gauss and above to work effectively in accordance with the principles of this invention. It is a requirement that the air and fuel flows be subject to opposite polarities of the magnets, referred herein to as a bipolar arrangement or configuration, so that if the air is subject to the magnetic field adjacent the north pole of the magnet then the fuel must be subject to the magnetic field adjacent the south pole of the magnet, and vice versa. There is nothing in the foregoing to prevent these polarities from being switched, so long as they remain opposite. The resultant conditioned fuel/air mixture magnetized in opposite polarities burns more completely, producing higher engine output, better fuel economy, more power and most importantly reduces the amount of hydrocarbons, carbon monoxide and oxides of nitrogen in the exhaust.

Another benefit of this invention is that magnetically charged fuel and air molecules with opposite polarities dissolve carbon build-up in carburetor jets, fuel injectors, and combustion chambers help to clean up the engine and maintain the clean condition. The preferred embodiment described above is equally useful where the engine employs a carburetor or fuel injection, with the fuel magnet being mounted on the fuel line leading to the carburetor or injectors, including the use of diesel fuel.

Figure 4:
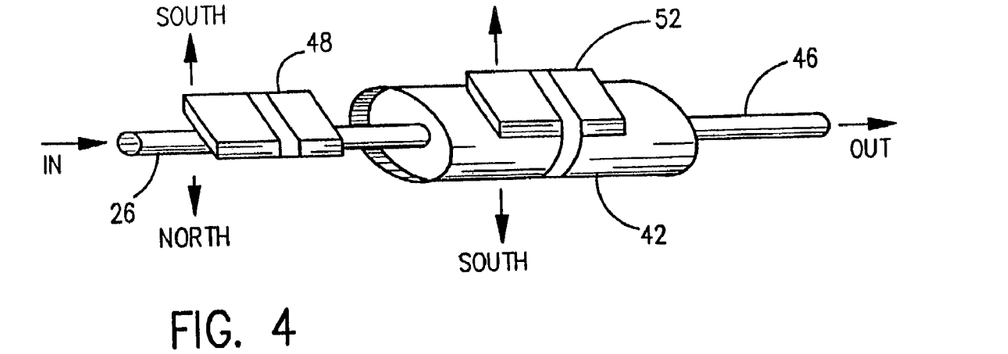
FIG. 4 is a schematic illustration of another embodiment of this invention as applied to an exemplary exhaust system and catalytic converter of an internal combustion engine.

The principles of this invention are also applicable to improve the efficiency of the catalytic converter whose purpose is primarily to oxidize any remaining carbon monoxide to carbon dioxide. Referring now to FIG. 4, and in another preferred embodiment of the present invention, a catalytic converter 42 is connected to receive the exhaust products from engine 12 through exhaust manifold 26 and discharge through exhaust pipe 46 to an exhaust system. Bar magnets 48 and 52 of design similar to those described earlier, including any required insulation or heat dissipation apparatus, are mounted on pipe 26 and converter 42, respectively, as illustrated, in a bipolar arrangement. In the illustrated arrangement, magnet 48 is mounted with the face containing the north pole in contact with exhaust pipe 26 whereas magnet 52 has its south pole facing catalytic converter 42. If desired, the magnets may be reversed as long as the bipolar arrangement is preserved. The arrangement of the magnets shown in FIG. 4 can be used alone or in any combination with the fuel and air conditioning system embodiments illustrated in FIGS. 1 through 3 or FIG. 5.

Figure 5:
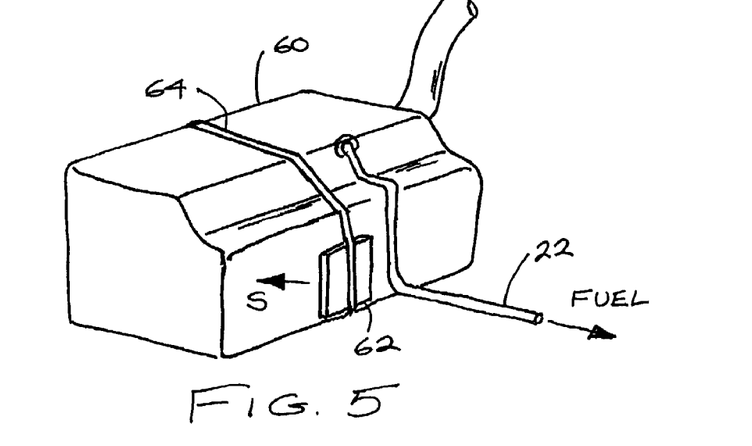
FIG. 5 is a schematic illustration of another preferred embodiment of the present invention as applied to an exemplary automotive fuel tank.

Referring now to FIG. 5, and in a more preferred embodiment of the present invention, an exemplary fuel tank 60 for a motor vehicle internal combustion engine incorporates a fuel tank magnet 62 that may be ferrous or ferroceramic, and may be a parallelepiped in configuration or shaped for the particular application. It is attached to fuel tank 60 by means of a clamp 64 of well known and commercially available type; however, it is readily apparent to one of ordinary skill in the art of the present invention that any means of securely fastening fuel tank magnet 62 to fuel tank 60 may be employed. It is further apparent that nothing in the foregoing prevents a fuel tank magnet 62 from being employed alone or in conjunction with any of the fuel and air conditioning system embodiments illustrated in FIGS. 1 through 3, or the exhaust conditioning system embodiment illustrated in FIG. 4.

Figure 6:
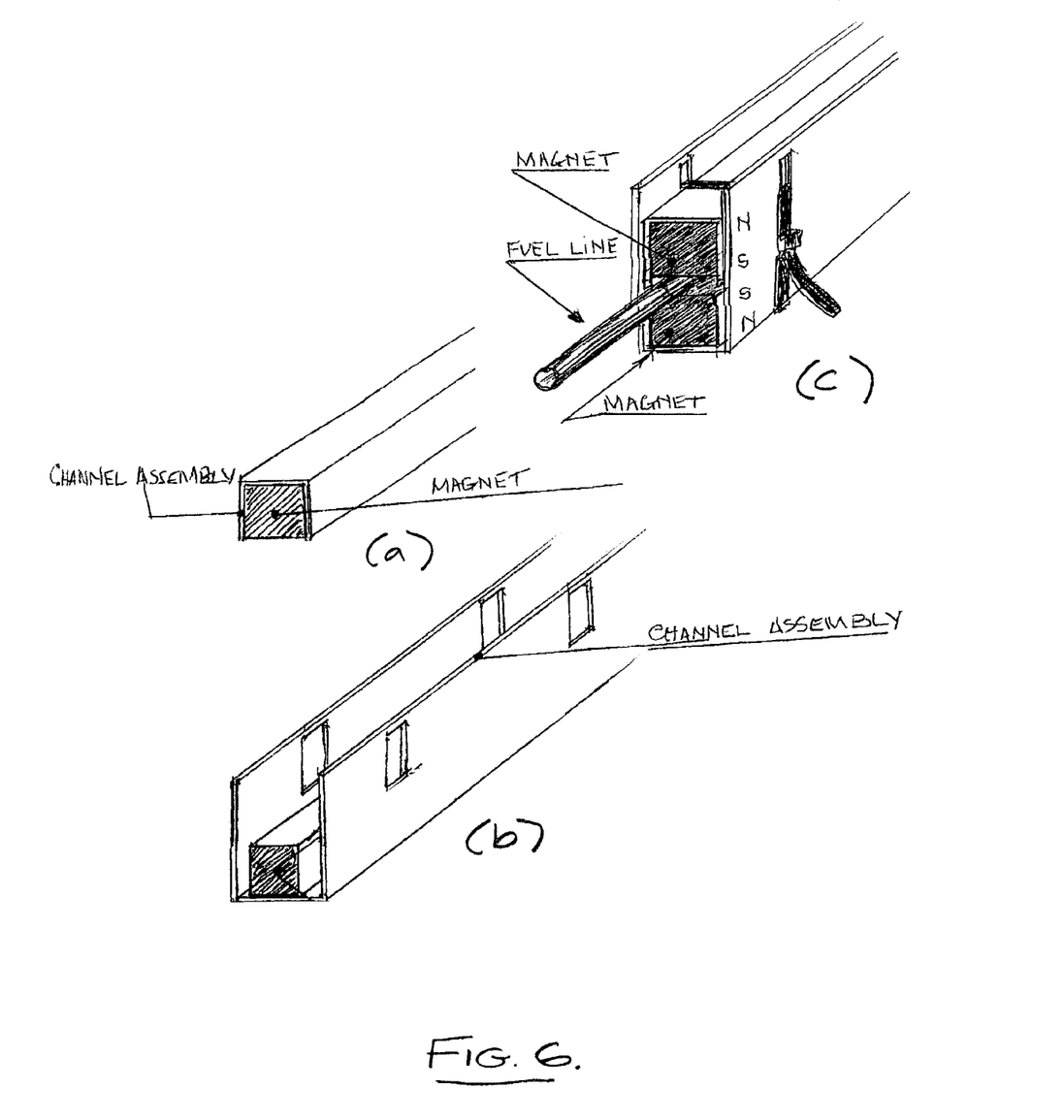
FIG. 6 comprises sections of a fuel line magnetizing apparatus according to another preferred embodiment of the present invention.

FIG. 6 comprises sections of a fuel line magnetizing apparatus according to another preferred embodiment of the present invention.

Figures 7, 8:
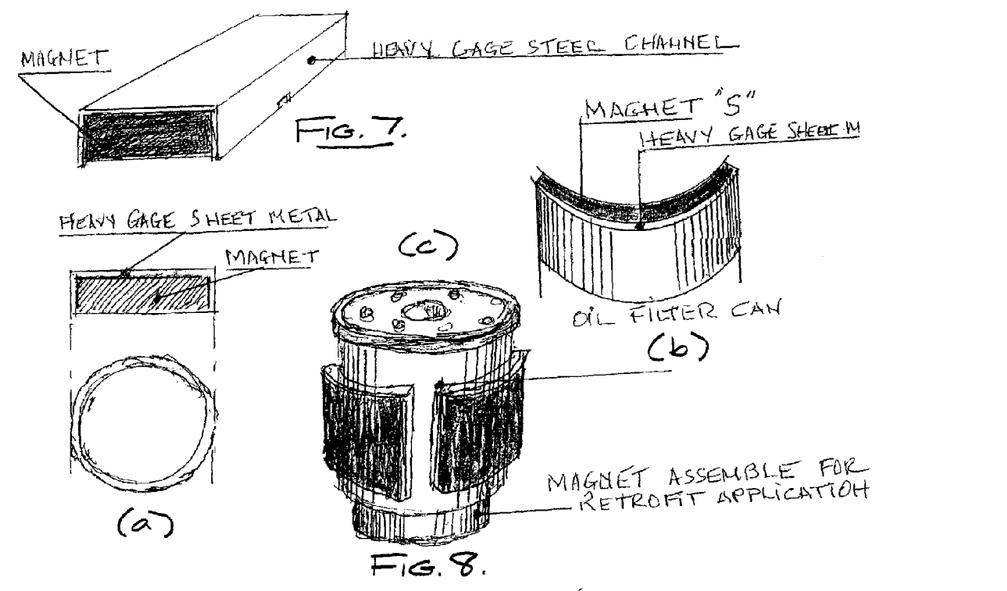
FIG. 7 is an oblique view drawing of an exemplary radiator intake magnetizing apparatus according to another embodiment of the present invention.
FIG. 8 is an oblique view drawing of an exemplary oil filter magnetizing apparatus according to another embodiment of the present invention.

FIG. 7 is an oblique view drawing of an exemplary radiator intake magnetizing apparatus according to another embodiment of the present invention.

FIG. 8 is an oblique view drawing of an exemplary oil filter magnetizing apparatus according to another embodiment of the present invention.

Figure 9:
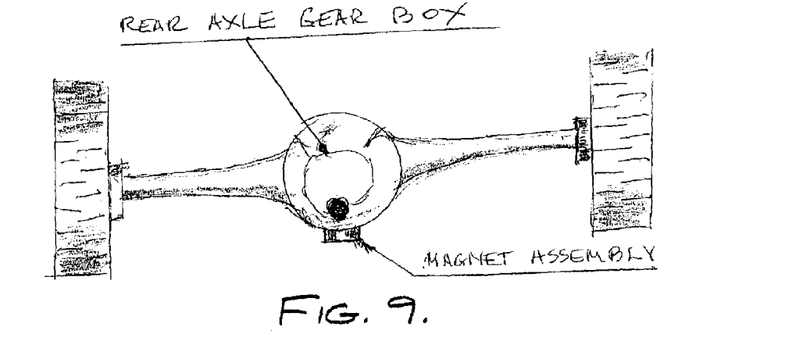
FIG. 9 is a plan view drawing of an exemplary gear box magnetizing apparatus shown as applied to an exemplary rear axle differential gear box according to another embodiment of the present invention.

FIG. 9 is a plan view drawing of an exemplary gear box magnetizing apparatus shown as applied to an exemplary rear axle differential gear box according to another embodiment of the present invention.

Figure 10:
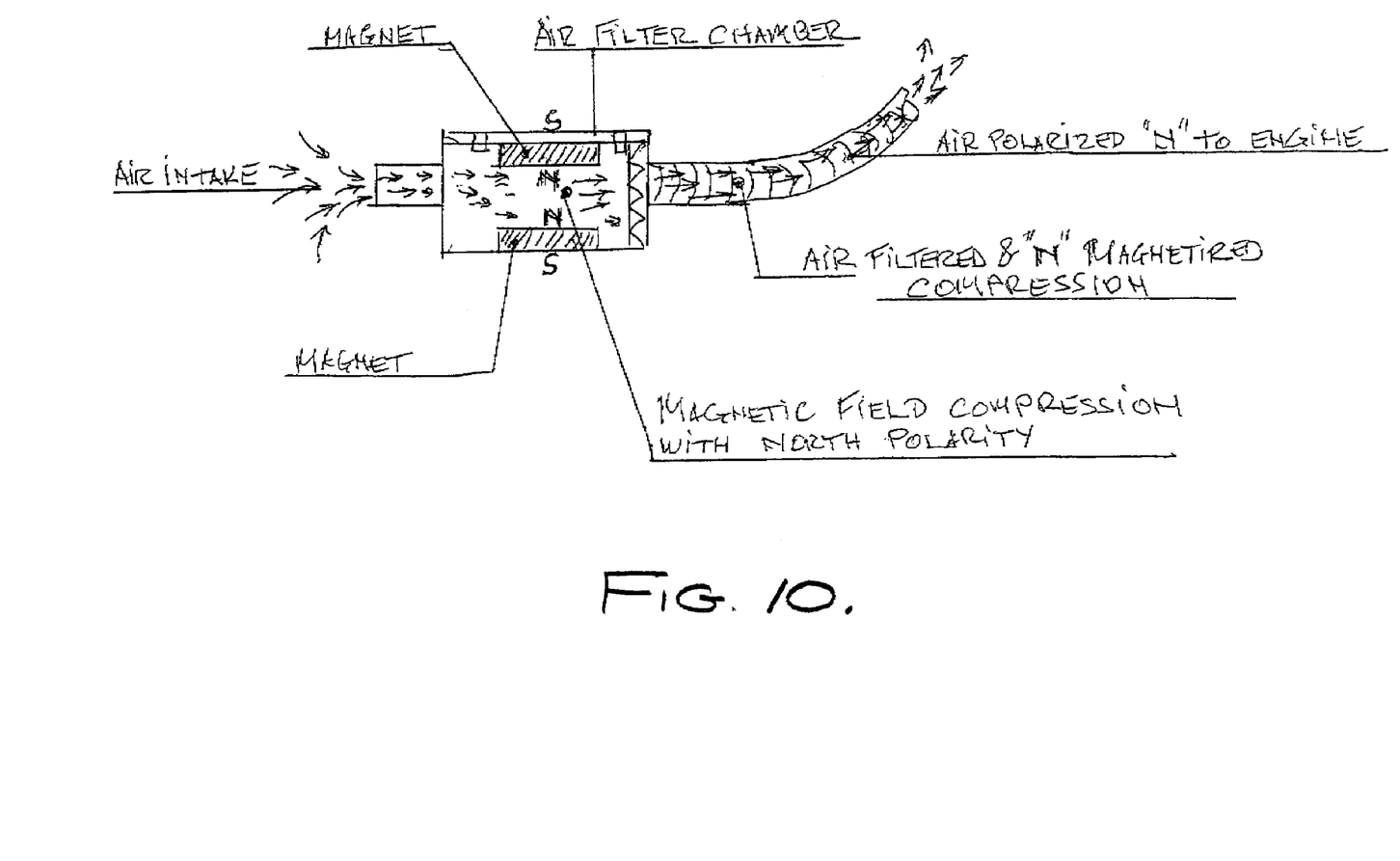
FIG. 10 is a section view drawing of another exemplary air intake and air filter magnetizing apparatus according to another embodiment of the present invention.

FIG. 10 is a section view drawing of another exemplary air intake and air filter magnetizing apparatus according to another embodiment of the present invention.

It is thus seen that there has been provided unique arrangements and method for improving the operation of internal combustion engines, reducing unwanted emissions, and improving generally the efficiency of such systems.

Having now fully set forth the preferred embodiments and certain modifications of the concept underlying the present invention, various other embodiments as well as certain variations and modifications thereto may obviously occur to those skilled in the art of the invention upon becoming familiar with the underlying concept. It is to be understood therefore that the invention may be practiced otherwise than as specifically set forth herein. By way of example, none of the foregoing prevents the use of electromagnets in the place of permanent magnets for any portion of the embodiments herein described. It is noted however that permanent magnets are the least complicated embodiment of the present invention and are the most amenable to installation in an existing internal combustion engine.

What is claimed is:

1. Apparatus for the conditioning of air and fuel being supplied to an internal combustion engine having a hydrocarbon fuel inlet line and an air inlet line, comprising:

first permanent magnet means mounted on said air inlet line, said magnet means having the shape of a parallelepiped with one face containing only one pole of said magnet means adjacent said air inlet line and the magnetic lines of force extending from said one face passing through said air inlet line, the other pole being contained within the face opposite that of said one face of said magnet means, the magnetic lines of force extending from said other pole being directed away from said air inlet line thereby the air flowing through said air inlet line being exposed only to the magnetic field emanating substantially from only one pole, said first magnet means comprising at least one air-intake magnet attached on the air intake line, each air-intake magnet attached to have a North magnetic polarity facing an air stream passing through the air intake line and a South magnetic polarity facing away from the air stream;

second permanent magnet means mounted on said fuel inlet line, said second magnet means having the shape of a parallepiped with one face containing only one pole of said magnet means from which the magnetic lines of force extend into and through the fuel within said fuel inlet line, the opposite pole of said second magnet means being located in the opposite face of said second magnet means, the magnetic lines of force extending therefrom being directed away from said fuel inlet line so that the fuel flowing in said fuel inlet line is subject to the magnetic field from substantially only one pole, said fuel inlet line having an interior fuel passage, an internal diameter, an exterior surface, and an external diameter, said second permanent magnet means comprising a set of plural fuel-line magnets symmetrically attached on the fuel inlet line exterior surface, all fuel-line magnets attached to the fuel inlet line exterior surface having a South magnetic polarity adjacent the exterior surface and a North magnetic polarity remote from the exterior surface, each fuel-line magnet being equidistant each adjacent magnet as measured along the fuel line exterior surface; and the first and second permanent magnet means being in a bipolar arrangement so that the incoming air and fuel are subject to the magnetic fields from opposite poles, wherein, each fuel-line magnet is a rectangular parallelepiped, and a width of each fuel-line magnet is no greater than the fuel line external diameter, the set of fuel-line magnets comprises exactly two magnets symmetrically attached on the fuel line exterior surface, the first of the two magnets being, as measured along the exterior surface, equidistant from a second of the two magnets each magnet includes a first generally horizontal surface adjacent the fuel line exterior surface, a second generally horizontal surface remote from the exterior surface, and vertical connecting surfaces connecting edges of the first horizontal surface to edges of the second horizontal surface, and further comprising:

a magnet channel housing each magnet, the channel comprising i) first and second generally vertical sides, each vertical side on one side of the encapsulated magnet, ii) a generally horizontal cover spanning between each of the first and second vertical sides, and iii) two air passages, a first of the channels further comprising plural strapping slots located along a length of the channel, a second of the channels fitting into the first channel with the fuel line intermediate the first and second channels; and strapping inserted through the slots of the fitted-together channels and clamping the channels and the two magnets to the fuel line.

2. The apparatus of claim 1 in which the strength of the magnets is at least 500 gauss.

3. The apparatus of claim 1 in which said engine is provided with a catalytic converter and means to transfer the combustion products of said engine to said converter, and means to subject said exhaust products leading to said converter and said converter to opposite magnetic fields.

4. The apparatus of claim 1, further comprising:

means for the conditioning the exhaust products of the internal combustion engine having an exhaust pipe carrying the combustion products from said engine, a catalytic converter for receiving said combustion products from said exhaust pipe for oxidizing some of the combustion products, said means comprising third permanent magnet means mounted on said exhaust pipe, said third magnet means having the shape of a parallepiped with one face containing only one pole of said third magnet means adjacent said exhaust pipe and the magnetic lines of force extending from said one face passing through said exhaust pipe, the other pole being contained within the face opposite that of said one face of said magnet means, the magnetic lines of force extending from said other pole being directed away from said exhaust pipe thereby the combustion products flowing through said exhaust pipe being exposed only to the magnetic field emanating substantially from only one pole;

fourth permanent magnet means mounted on said catalytic converter, said fourth magnet means having the shape of a parallepiped with one face containing only one pole of said magnet means from which the magnetic lines of force extend into and through the interior of said converter, the opposite pole of said fourth magnet means being located in the opposite face of said fourth magnet means, the magnetic lines of force extending therefrom being directed away from said converter so that the interior of said catalytic converter is subject to the magnetic field from substantially only one pole; and the third and fourth permanent magnet means being in a bipolar arrangement so that the exhaust products in said exhaust pipe and the interior of said catalytic converter are subject to the magnetic fields from opposite poles.

5. The apparatus of claim 1, wherein, each magnet has a strength of at least 1100 Gauss.

6. A system for conditioning air and fuel being supplied to an internal combustion engine, comprising:

a fuel line with an interior fuel passage, an internal diameter, an exterior surface, and an external diameter;

a set of plural fuel-line magnets symmetrically attached on the fuel line exterior surface, all fuel-line magnets attached to the fuel line exterior surface having a South magnetic polarity adjacent the exterior surface and a North magnetic polarity remote from the exterior surface, each fuel-line magnet being equidistant each adjacent magnet as measured along the fuel line exterior surface;

an air intake; and at least one air-intake magnet attached on the air intake, each air-intake magnet attached to have a North magnetic polarity facing an air stream passing through the air intake and a South magnetic polarity facing away from the air stream, wherein, each fuel-line magnet is a rectangular parallelepiped, and the fuel line external diameter is greater than the width of each magnet, the set of fuel-line magnets comprises at least two magnets symmetrically attached on the fuel line exterior surface, a first of the two magnets being, as measured along the fuel line exterior surface, equidistant from any other magnet of the set, the set comprises exactly two magnets symmetrically attached on the exterior surface, the first of the two magnets being, as measured along the exterior surface, equidistant from a second of the two magnets, each magnet includes a first generally horizontal surface adjacent the fuel line exterior surface, a second generally horizontal surface remote from the exterior surface, and vertical connecting surfaces connecting edges of the first horizontal surface to edges of the second horizontal surface, and further comprising:

a magnet channel housing each magnet, the channel comprising i) first and second generally vertical sides, each vertical side on one side of the encapsulated magnet, ii) a generally horizontal cover spanning between each of the first and second vertical sides, and iii) two air passages, a first of the channels further comprising plural strapping slots located along a length of the channel, a second of the channels fitting into the first channel with the fuel line intermediate the first and second channels; and strapping inserted through the slots of the fitted-together channels and clamping the channels and the two magnets to the fuel line.

7. The system of claim 6, wherein, each magnet has a strength of at least 1100 Gauss.

* * * * *